(12) United States Patent
Wu et al.

(10) Patent No.: US 11,553,139 B2
(45) Date of Patent: Jan. 10, 2023

(54) VIDEO FRAME SYNTHESIS USING TENSOR NEURAL NETWORKS

(71) Applicant: INTERNATIONAL BUSINESS MACHINES CORPORATION, Armonk, NY (US)

(72) Inventors: Bo Wu, Cambridge, MA (US); Chuang Gan, Cambridge, MA (US); Tengfei Ma, White Plains, NY (US); Dakuo Wang, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 17/036,624

(22) Filed: Sep. 29, 2020

(65) Prior Publication Data

US 2022/0103761 A1    Mar. 31, 2022

(51) Int. Cl.
*H04N 5/262* (2006.01)
*G06N 3/04* (2006.01)

(52) U.S. Cl.
CPC .......... *H04N 5/262* (2013.01); *G06N 3/0454* (2013.01); *G06N 3/0481* (2013.01)

(58) Field of Classification Search
CPC .... H04N 5/262; G06N 3/0454; G06N 3/0481; G06T 11/00
See application file for complete search history.

(56) References Cited

U.S. PATENT DOCUMENTS

| | | | |
|---|---|---|---|
| 10,740,939 B1 | 8/2020 | Chung et al. | |
| 2019/0138889 A1* | 5/2019 | Jiang | G06T 7/251 |
| 2019/0318726 A1 | 10/2019 | Jin et al. | |
| 2020/0036995 A1* | 1/2020 | Rippel | G06V 10/774 |
| 2020/0151559 A1* | 5/2020 | Karras | G06N 3/0472 |

(Continued)

FOREIGN PATENT DOCUMENTS

| | | |
|---|---|---|
| CN | 109188327 A | 1/2019 |
| CN | 109446473 A | 3/2019 |
| CN | 109951705 A | 6/2019 |

(Continued)

OTHER PUBLICATIONS

Yeganli et al., "An Iterative Method for Tensor Inpainting Based on Higher-Order Singular Value Decomposition", Circuits Systems and Signal Processing, pp. 1-19, Dec. 2017.

(Continued)

*Primary Examiner* — Lin Ye
*Assistant Examiner* — John H Morehead, III
(74) *Attorney, Agent, or Firm* — Tutunjian & Bitetto, P.C.; Stosch Sabo

(57) ABSTRACT

A method for implementing video frame synthesis using a tensor neural network includes receiving input video data including one or more missing frames, converting the input video data into an input tensor, generating, through tensor completion based on the input tensor, output video data including one or more synthesized frames corresponding to the one or more missing frames by using a transform-based tensor neural network (TTNet) including a plurality of phases implementing a tensor iterative shrinkage thresholding algorithm (ISTA), and obtaining a loss function based on the output video data.

20 Claims, 8 Drawing Sheets

(56) References Cited

U.S. PATENT DOCUMENTS

2020/0380261 A1* 12/2020 Chandran .............. G06V 20/46
2022/0103823 A1*  3/2022 Jiang .................... G06N 3/0454

FOREIGN PATENT DOCUMENTS

| CN | 110139046 A | 8/2019 |
| CN | 110223243 A | 9/2019 |
| CN | 110533736 A | 12/2019 |
| CN | 111310862 A | 6/2020 |
| CN | 111626944 A | 9/2020 |

OTHER PUBLICATIONS

Miadathil et al., "Tensor Low Rank Modeling and Its Applications in Signal Processing", arXiv: Signal Processing (2019), pp. 1-24, Dec. 2019.
Chaturvedi et al., "Video Object Tracking based on Automatic Background Segmentation and updating using RBF neural network", International Journal of Advanced Computer Research, vol. 3, pp. 86-90, Jun. 2013.
International Search Report issued in corresponding PCT Application No. PCT/CN2021/106787 dated Oct. 14, 2021, 4 pgs.
Written Opinion issued in corresponding PCT Application No. PCT/CN2021/106787 dated Oct. 14, 2021, 4 pgs.

* cited by examiner

VIDEO FRAME SYNTHESIS USING TENSOR NEURAL NETWORKS

BACKGROUND

The present invention generally relates to artificial intelligence and, more particularly, to video frame synthesis using tensor neural networks.

Video frame synthesis is a task in computer vision that has drawn great interest in a wide variety of applications. During video frame synthesis, new video frames are constructed from an existing video. Video frame synthesis can be divided into two categories, video frame interpolation and video frame prediction. Video frame interpolation constructs new video frames by recovering missing frames between the existing video frames, and video frame prediction constructs new video frames by generating future frames from prior frames. Video frame synthesis techniques have a variety of uses. For example, video frame synthesis techniques can transform standard videos into high-quality slow-motion videos with higher frame rates and smooth view transitions, compensate for distortions from camera shake in video recording using video stabilization, and mitigate the missing video frame problem in wireless video transmissions using motion smoothing (e.g. in unmanned aerial vehicle (UAV) and virtual reality (VR) applications).

Existing video frame synthesis solutions suffer from one or more deficiencies. For example, existing neural network-based methods do not explicitly impose tensor-low rankness to capture spatiotemporal correlations of video frames in a high-dimensional space, and do not have potentially mathematical interpretations. Additionally, compressive sensing-based iterative algorithms generally require handcrafted parameters and a relatively long running time for high-quality video frame synthesis. For example, some existing optimization algorithms may require more than an hour to process a one minute video (30 frames per second) with 100 missing frames. Therefore, it would be advantageous to provide a video synthesis solution that addresses at least the above-noted problems.

SUMMARY

A method for implementing video frame synthesis using a tensor neural network includes receiving input video data including one or more missing frames, converting the input video data into an input tensor, generating, through tensor completion based on the input tensor, output video data including one or more synthesized frames corresponding to the one or more missing frames by using a transform-based tensor neural network (TTNet) including a plurality of phases implementing a tensor iterative shrinkage thresholding algorithm (ISTA), and obtaining a loss function based on the output video data.

In an embodiment of the method, generating the output tensor includes, for a given one of the plurality of phases of the TTNet, updating an intermediate synthesis result in an original domain, transforming the intermediate synthesis result in the original domain into a transformed intermediate synthesis result in a transform domain, applying soft-thresholding based on the transformed intermediate synthesis result to generate synthesized video data in the transform domain, and transforming the synthesized video data in the transform domain back to the original domain using an inverse transformation.

In an embodiment of the method, the intermediate synthesis result in the original domain is defined based in part on a video tensor received by the given one of the plurality of phases and an observation tensor.

In an embodiment of the method, transforming the intermediate synthesis result in the original domain into the transformed intermediate synthesis result includes applying a first convolution to the intermediate synthesis result, applying an activation function to an output of the first convolution, and applying a second convolution to an output of the activation function to generate the transformation. In one embodiment, the first and second convolutions include two-dimensional (2D) multi-channel convolutions with different kernels, and the activation function is a rectified linear unit (ReLU).

In an embodiment of the method, applying soft-thresholding based on the transformed intermediate synthesis result to generate the synthesized video data in the transform domain includes applying a plurality of soft-thresholding operations in parallel to each frontal slice of the transformed intermediate synthesis result, and stacking outputs of the plurality of soft-thresholding operations to generate the synthesized video data in the transform domain.

In an embodiment of the method, transforming the synthesized video data in the transform domain back to the original domain using an inverse transformation includes applying a third convolution to the synthesized video data in the transform domain, applying a second activation function to an output of the third convolution, and applying a fourth convolution to an output of the second activation function. In one embodiment, the third and fourth convolutions 2D multi-channel convolutions with different kernels, and the activation function is a ReLU.

In an embodiment of the method, transforming the synthesized video data in the transform domain back to the original domain using an inverse transformation includes applying a first convolution to the synthesized video data in the transform domain, applying an activation function to an output of the third convolution, and applying a second convolution to an output of the activation function. In one embodiment, the first and second convolutions include 2D multi-channel convolutions with different kernels, and the activation function is a ReLU.

In an embodiment of the method, the loss function includes a first part that evaluates accuracy of the one or more synthesized frames, and a second part that imposes sparsity. More specifically, the loss function may be a linear combination of the first and second parts.

A system for implementing video synthesis using a tensor neural network includes a memory configured to store program code, and at least one processor device operatively coupled to the memory. The at least one processor device is configured to execute program code stored on the memory device to receive input video data including one or more missing frames, convert the input video data into an input tensor, generate, through tensor completion based on the input tensor, output video data including one or more synthesized frames corresponding to the one or more missing frames by using a transform-based tensor neural network (TTNet) including a plurality of phases implementing a tensor iterative shrinkage thresholding algorithm (ISTA), and obtain a loss function based on the output video data.

In an embodiment of the system, the at least one processor device is configured to generate the output tensor by, for a given one of the plurality of phases of the TTNet, updating an intermediate synthesis result in an original domain, transforming the intermediate synthesis result in the original domain into a transformed intermediate synthesis result in a transform domain, applying soft-thresholding based on the transformed intermediate synthesis result to generate synthesized video data in the transform domain, and transforming the synthesized video data in the transform domain back to the original domain using an inverse transformation.

In an embodiment of the system, the intermediate synthesis result in the original domain is defined based in part on a video tensor received by the given one of the plurality of phases and an observation tensor.

In an embodiment of the system, the at least one processor device is configured to transform the intermediate synthesis result in the original domain into the transformed intermediate synthesis result by applying a first convolution to the intermediate synthesis result, applying an activation function to an output of the first convolution, and applying a second convolution to an output of the activation function to generate the transformation. In one embodiment, the first and second convolutions include two-dimensional (2D) multi-channel convolutions with different kernels, and the activation function is a rectified linear unit (ReLU).

In an embodiment of the system, the at least one processor device is configured to apply soft-thresholding based on the transformed intermediate synthesis result to generate the synthesized video data in the transform domain by applying a plurality of soft-thresholding operations in parallel to each frontal slice of the transformed intermediate synthesis result, and stacking outputs of the plurality of soft-thresholding operations to generate the synthesized video data in the transform domain.

In an embodiment of the system, the at least one processor device is configured to transform the synthesized video data in the transform domain back to the original domain using an inverse transformation includes applying a first convolution to the synthesized video data in the transform domain, applying an activation function to an output of the third convolution, and applying a second convolution to an output of the activation function. In one embodiment, the first and second convolutions include 2D multi-channel convolutions with different kernels, and the activation function is a ReLU.

In an embodiment of the system, the loss function includes a first part that evaluates accuracy of the one or more synthesized frames, and a second part that imposes sparsity. More specifically, the loss function may be a linear combination of the first and second parts.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use a tensor neural network to perform video synthesis. More specifically, the embodiments described herein can represent video data as a tensor and construct a transform-based tensor neural network (TTNet) by unfolding a tensor iterative shrinkage thresholding algorithm (ISTA) into a multi-phase neural network. That is, the embodiments described herein cast the video frame synthesis task as a tensor recovery problem by reconstructing a multiway tensor from a subset of slices (e.g., frontal slices). Due to spatiotemporal correlations of video frames, the embodiments described herein can solve the tensor recovery problem by performing tensor rank minimization in a transform domain. The embodiments described herein can exploit the low-rankness of video data in the transform domain with a relatively high synthesis speed.

The embodiments described herein can provide improvements over existing video synthesis techniques (e.g., interpolation and prediction of video frames). For example, the embodiments described herein can improve the peak signal-to-noise ratio (PSNR) of interpolation and prediction of, e.g., 4.13 dB and 4.16 dB. Additional advantages over existing video synthesis solutions include, for example, motion blurring reduction and artifact avoidance.

Figure 1:
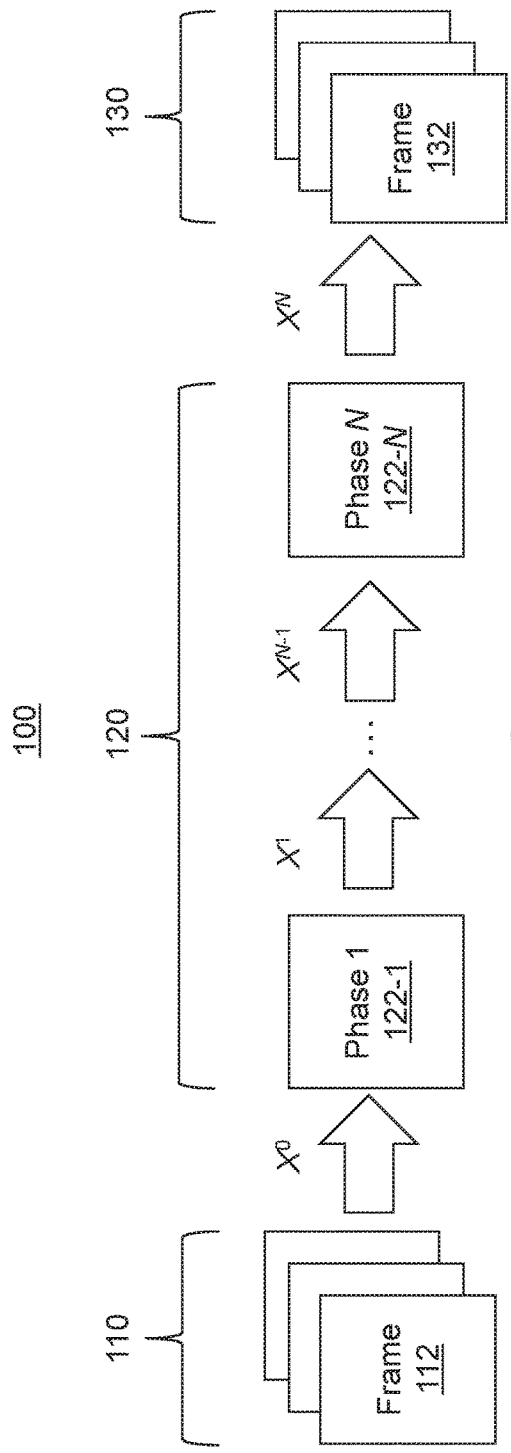
FIG. 1 is a block/flow diagram of a high-level overview of a video frame synthesis system using a transform-based tensor neural network (TTNet), in accordance with an embodiment of the present invention.

Referring now to the drawings in which like numerals represent the same or similar elements and initially to FIG. 1, a block/flow diagram is provided showing a high-level overview of a video frame synthesis system 100.

As shown, the system 100 includes input video data 110 including a plurality of frames. For example, the input video data 110 can include a frame 112. Although the input video data 110 is shown including three frames, the input video data 110 can include any suitable number of frames in accordance with the embodiments described herein. More specifically, the input video data 110 includes one or more missing frames.

The primary goal of the system 100 is to synthesize the one or more missing video frames to generate recovered video data (e.g., using video frame interpolation and/or prediction). To achieve this goal, the system 100 further includes a transform-based tensor neural network (TTNet) 120.

The following definitions (1)-(5) will be needed to further describe the video frame synthesis task performed by the system 100. Given an invertible linear transform L: $\mathbb{R}^{1 \times 1 \times n_3} \rightarrow \mathbb{R}^{1 \times 1 \times n_3}$, the tube multiplication of x, y$\in \mathbb{R}^{1 \times 1 \times n_3}$, $\otimes$, can be defined as:

$$x \otimes y = L^{-1}(L(x) \odot L(y)) \quad (1)$$

where $L^{-1}$ is the inverse of L and $\odot$ denotes the Hadamard (element-wise) product. The L-product of tensors $X \in \mathbb{R}^{n_1 \times n_2 \times n_3}$ and $Y \in \mathbb{R}^{n_2 \times n_4 \times n_3}$, $Z = X \otimes Y$, a tensor of size $n_1 \times n_4 \times n_3$ such that:

$$Z(i,j,:) = \Sigma_{s \in n_2} X(i,s,:) \otimes Y(s,j,:) \quad (2)$$

for $i \in [n_1]$ and $j \in [n_4]$, where each [n] corresponds to an index set $\{1, 2, \ldots, n\}$, and X(i,s,:) and Y(s,j,:) each correspond to a tube. For the tensor X, its transpose $X^\dagger \in \mathbb{R}^{n_2 \times n_1 \times n_3}$ is defined as:

$$(X^\dagger)^{(k)} = (X^{(k)})^H \quad (3)$$

where $k \in [n_3]$ and $(X^{(k)})^H$ denotes the Hermitian (conjugate) transpose of $X^{(k)}$. If X is L-diagonal, its (frontal) slices correspond to diagonal matrices and $X \otimes X^\dagger = X^\dagger \otimes X = 1$, where $I \in \mathbb{R}^{n \times n \times n_3}$ is L-diagonal with e's on the diagonals. That is, the tube $I(i,s,:) = L^{-1}(1")$ for $i \in [n]$, and all other tubes are 0", where 1", 0" $\in \mathbb{R}^{1 \times 1 \times n_3}$ denote tubes with all entries equal to 1 or 0, respectively. The L-SVD of a tensor $T \in \mathbb{R}^{n_1 \times n_2 \times n_3}$ is defined as:

$$T = U \otimes S \otimes V^\dagger \quad (4)$$

where $U \in \mathbb{R}^{n_1 \times n_2 \times n_3}$ and $V \in \mathbb{R}^{n_2 \times n_2 \times n_3}$ are L-orthogonal tensors and $S \in \mathbb{R}^{n_1 \times n_2 \times n_3}$ is an L diagonal tensor. Then, the L-tubal rank of T is defined as the number of non-zero tubes of S. Lastly, the tensor nuclear norm of the tensor X is defined as:

$$\|X\|_{TNN} = \Sigma_{k \in [n_3]} \|\tilde{X}^{(k)}\|. \quad (5)$$

where $\|\cdot\|$ denotes the matrix nuclear-norm and $\tilde{X}^{(k)}$ is a frequency domain representation obtained by taking a Fourier transform along the third-dimension of X.

Given the above-definitions, the video frame synthesis task can be formally modeled as a tensor completion problem with random missing (frontal) slices. For example, consider a video tensor $X \in \mathbb{R}^{n_1 \times n_2 \times n_3}$. Let $\Omega \subseteq [n_3]$ be the set of observed video frames. An observation tensor $\Phi \in \mathbb{R}^{n_1 \times n_2 \times n_3}$ can be defined having k-th (frontal) slices $\Phi(:,:,k)$ as follows:

$$\Phi(:, :, k) = \begin{cases} 1', & k \in \Omega \\ 0', & \text{otherwise} \end{cases} \quad (6)$$

where 1' denotes an $n_1 \times n_2$ matrix of ones and 0' denotes an $n_1 \times n_2$ matrix of zeroes. Then, the observed video frames of a video corresponding to a tensor $T \in \mathbb{R}^{n_1 \times n_2 \times n_3}$ can be expressed as $Y = \Phi \odot T$ and the k-th (frontal) slices of $Y(:,:,k)$ can be defined as:

$$Y(:, :, k) = \begin{cases} T^{(k)}, & k \in \Omega \\ 0, & \text{otherwise} \end{cases} \quad (7)$$

where $\odot$ again denotes the Hadamard (element-wise) product.

The tensor completion problem can generally be solved since compressive sensing (CS) theory shows that a signal sampled at a rate lower than the Nyquist rate can be reconstructed, and an iterative shrinkage thresholding algorithm (ISTA) can be employed to solve CS problems with dense matrix data.

With the foregoing in mind, as shown, the TTNet 120 can include a plurality of phases 122-1 through 122-N. Each of the phases 122-1 through 122-N has the same architecture but different parameter values.

The input video data 110 is converted into a tensor $X^0$, which is received by phase 1 122-1. A tensor output at phase 1 122-1, $X^1$ is sent to a next phase of the TTNet 120. The N-th phase of the TTNet receives a tensor output by the preceding phase of the TTNet 120, $X^{N-1}$, and outputs a tensor $X^N$. The tensor $X^N$ corresponds to a synthesized result that would be compared with the ground truth to calculate training loss for convergence acceleration. A recovered result 130 having a plurality of frames including frame 132 is obtained. The recovered result 130 corresponds to the input video data with the one or more missing frames included.

In view of the above definitions, the video frame synthesis task can be cast as completing the tensor T from the observed frontal slices indexed by $\Omega$. Thus, the objective becomes finding a video tensor X with an L-tubal rank$\leq$r such that $\Phi \otimes X = Y$. More specifically, the tensor completion problem is provided as follows:

$$\underset{X \in \mathbb{R}^{n_1 \times n_2 \times n_3}}{\text{argmin}} \left\{ \frac{1}{2} \|\Phi \odot X - Y\|_F^2 + \lambda \|X\|_{TNN} \right\} \quad (8)$$

where $\|T\|_F^2$ for some tensor T is defined as $\sqrt{\Sigma_{i=1}^{n_1} \Sigma_{j=1}^{n_2} \Sigma_{k=1}^{n_3} |T(i,j,k)|^2}$, and $\lambda$ is a constant parameter. The term $\lambda \|X\|_{TNN}$ is used to impose sparsity. As will be described in further detail below with reference to FIG. 2, each of the phase 122-1 through 122-N includes a plurality of components or modules designed to implement an inference iteration of a tensor ISTA algorithm used to solve the tensor completion problem. For $t \in [1,N]$, the tensor ISTA algorithm performed at phase t is proposed as follows:

$$X^t = \underset{X \in \mathbb{R}^{n_1 \times n_2 \times n_3}}{\text{argmin}} \left\{ \frac{1}{2} \|X - R^t\|_F^2 + \lambda \|X\|_{TNN} \right\} \quad (9)$$

$$R^t = X^{t-1} - \rho \Phi \odot (\odot X^{t-1} - Y) \quad (10)$$

where $\rho$ is a step size and $R^t$ is an intermediate synthesis result in an original domain.

As will be described in further detail below with reference to FIG. 2, a given one of the plurality of phases 122-1 through 122-N can include an update module, a transform module, a soft-thresholding module, and an inverse transform module. The update module calculates the gradient of $\|\Phi \otimes X^\dagger - Y\|_F^2$ by using equation (9) to update the intermediate synthesis result in the original domain $R^t$, the transform module transforms the intermediate synthesis result into a transformed intermediate synthesis result in a transform domain ($\overline{R}^t$), the soft-thresholding module applies a soft-thresholding operation on each (frontal) slice of $\overline{R}^t$ to generate synthesized video data in the transform domain ( $X^{\dagger,(k)}$), and the inverse transform module transforms the synthesized video data in the transform domain back to the original domain.

A loss function including two loss terms can be used. One loss term evaluates the accuracy of the synthesized video frames and the other loss term imposes the sparsity of video frame tensors in the transform domain. For example, a loss function L including an accuracy loss term $L_{accuracy}$ and a sparsity loss term $L_{sparsity}$ can be defined as:

$$L = \alpha L_{accuracy} + \beta L_{sparsity} \quad (11)$$

where $\alpha$ and $\beta$ are parameters that balance the accuracy and sparsity loss terms. In an illustrative embodiment, $\alpha$ and $\beta$ can be set to 1 and 0.1 by default, respectively. For example, $L_{accuracy}$ can be defined as $\|X^N - X\|_F^2$ and $L_{sparsity}$ can be defined as $$\frac{1}{N}\sum_{t=1}^{N}\|X^N\|_{TNN},$$

such that $$L = \alpha\|X^N - X\|_F^2 + \frac{\beta}{N}\sum_{t=1}^{N}\|X^N\|_{TNN} \quad (12)$$

The tensor ISTA algorithm in accordance with the embodiments described herein provides improvements over conventional ISTA algorithms that transform the video data into matrix representations which could lose spatiotemporal information.

Figure 2:
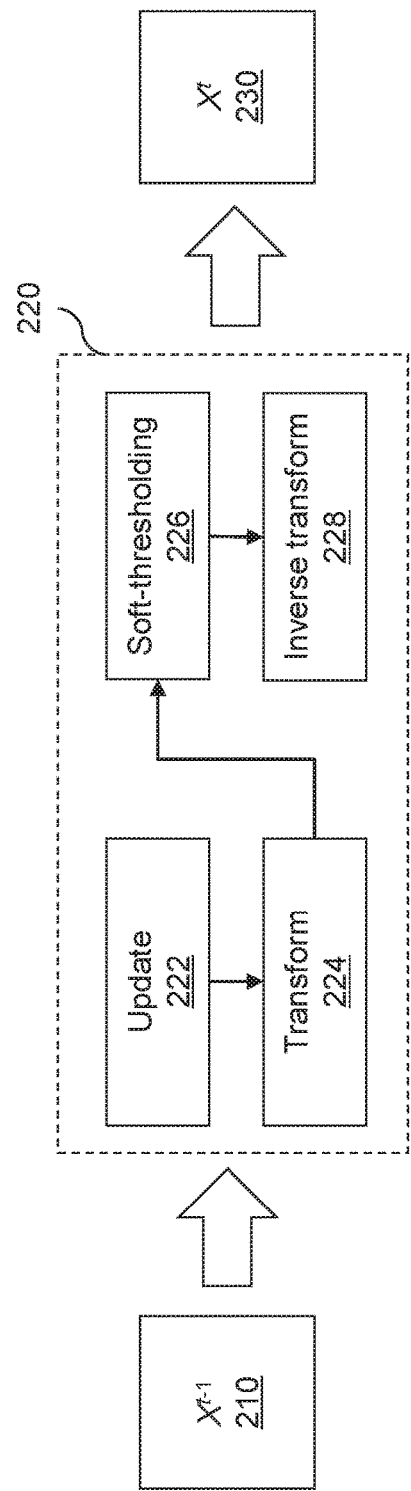
FIG. 2 is a block/flow diagram of modules of a phase of the TTNet of FIG. 1, in accordance with an embodiment of the present invention.

Referring now to FIG. 2, a block/flow diagram is provided illustrating an overview of a phase of a transform-based tensor neural network (TTNet) 200.

As shown, an input tensor generated at the t−1-th phase, $X^{t-1}$ 210, where $X^{t-1} \in \mathbb{R}^{n_1 \times n_2 \times n_3}$, is received by a phase 220 of the TTNet 200. The phase 220 corresponds to a given one of a plurality of N phases of the TTNet, as described above with reference to FIG. 1. More specifically, the phase 220 is a t-th phase configured to generate a tensor output $X^t$ 230, where $X^t \in \mathbb{R}^{n_1 \times n_2 \times n_3}$. Accordingly, if, t=N, then $X^t$ 230 equals $X^N$ corresponds to a final tensor output of the TTNet.

The phase 220 corresponds to one inference iteration of a tensor iterative shrinkage thresholding algorithm (ISTA) implemented by the TTNet 200 used to generate the final output tensor $X^N$. More specifically, phase 220 includes a plurality of modules configured to implement the inference iteration of the tensor ISTA algorithm, including an update module 222, a transform module 224, a soft-thresholding module 226, and an inverse transform module 228.

The update module 222 is configured to generate an updated intermediate synthesis result in an original domain as described in further detail above with reference to FIG. 1. More specifically, the update module 222 can calculate the gradient of $\|\Phi \otimes X^t - Y\|_F^2$ by using equation (9), where $R^t = X^{t-1} - \rho \Phi \odot (\odot X^{t-1} - Y)$, to generate the updated intermediate synthesis result in the original domain.

The aim of the TTNet 200 is to find a solution to the tensor completion problem in a learned transform domain, and then transform the solution back to the original domain. To achieve this, the transform module 224 is configured transform the updated intermediate synthesis result into a transformed intermediate result in a transform domain. Further details regarding the transform module will now be described below with reference to FIG. 3.

Figure 3:
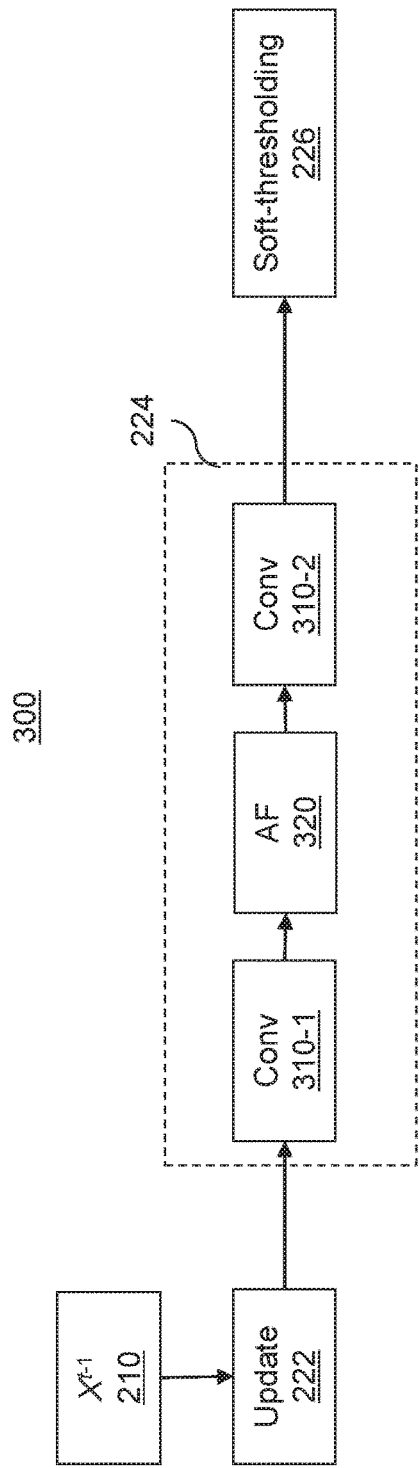
FIG. 3 is a block/flow diagram of an exemplary transform module of the phase of FIG. 2, in accordance with an embodiment of the present invention.

With reference to FIG. 3, a block/flow diagram is provided illustrating an exemplary transform-based tensor neural network (TTNet) 300. As shown, the TTNet 300 includes the update module 222 configured to receive the tensor input 210, the transform module 224, and the soft-thresholding module 226 described above with reference to FIG. 2.

As further shown, in this illustrative example, the transform module 224 includes a plurality of components including a first convolution (Cony) component 310-1, an activation function (AF) component 320 and a second Cony component 310-2. In one embodiment, the first and second Cony components 310-1 and 310-2 implement two-dimensional (2D) multi-channel convolutions with different kernels, and the AF component 320 includes a rectified linear unit (ReLU) that incorporates nonlinearity.

The first Cony component 310-1 receives the updated intermediate synthesis result from the update module 222 to generate $Conv(R^t)$. Then, the AF component 320 applies the activation function to $Conv(R^t)$. For example, if the AF component 320 includes a ReLU, then the application of the activation function to $Conv(R^t)$ generates $ReLU(Conv(R^t))$. Then, the second Cony component 310-2 applies a second convolution to $ReLU(Conv(R^t))$ to generate $Conv(ReLU(Conv(R^t))) = F(R^t) = \overline{R}^t$, which corresponds to the transformed intermediate synthesis result.

Referring back to FIG. 2, after the transformed intermediate synthesis result, $F(R^t) = \overline{R}^t$, has been obtained, the soft-thresholding module 226 is configured to apply soft-thresholding based on the transformed intermediate synthesis result to generate synthesized video data in the transform domain. More specifically, the synthesized video data in the transform domain corresponds to a tensor. In one embodiment, the soft-thresholding module 226 is configured to apply the soft-thresholding by applying a soft-thresholding operation on each (frontal) slice of $\overline{R}^t$ separately to generate the synthesized video data in the transform domain. Further details regarding the soft-thresholding module 226 will now be described below with reference to FIG. 4.

Figure 4:
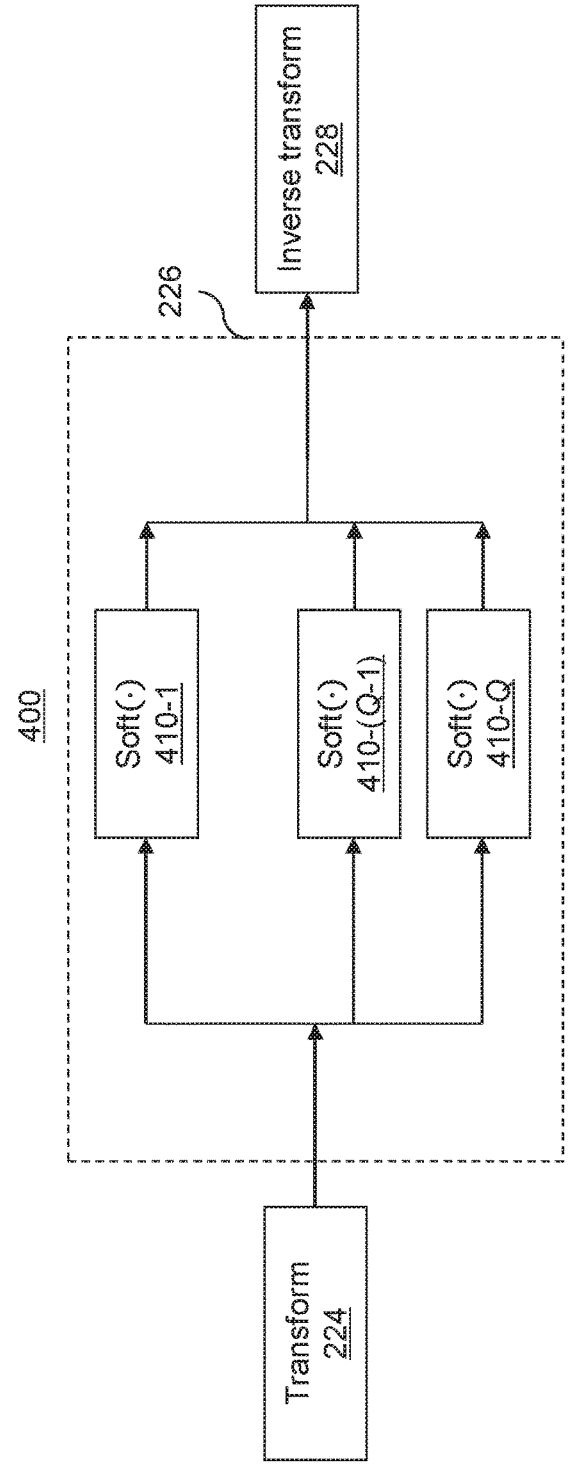
FIG. 4 is a block/flow diagram of an exemplary soft-thresholding module of the phase of FIG. 2, in accordance with an embodiment of the present invention.

With reference to FIG. 4, a block/flow diagram is provided illustrating an exemplary transform-based tensor neural network (TTNet) 400. As shown, the TTNet 400 includes the transform module 224, the soft-thresholding module 226, and the inverse transform module 228 described above with reference to FIG. 2.

As further shown, in this illustrative example, the soft-thresholding module 226 includes a plurality of soft-thresholding components 410-1 through 410-Q configured to perform parallel soft-thresholding operations, where Q equals $n_3$, as described above with reference to FIG. 1. More specifically, each of the plurality of soft-thresholding components 410-1 through 410-Q is configured to receive a respective one of $F(R^t)^{(1)}$ through $F(R^t)^{(Q)}$ as input and generate a respective (matrix) output. After the parallel soft-thresholding operations are performed, the outputs of the plurality of soft-thresholding components 410-1 through 410-Q are stacked together to form a tensor, $F(X^t) = \overline{X}^t$, corresponding to synthesized video data in the transform domain. For example:

$$F(X^t)^{(k)} = \text{soft}(F(R^t)^{(k)}, \lambda) \quad (13)$$

where soft(•) is the element-wise soft-thresholding operation defined as follows:

$$\text{soft}(Y_{ij}, \lambda) = \begin{cases} Y_{ij} + \lambda & \text{if } Y_{ij} \leq -\lambda \\ 0 & \text{if } |Y_{ij}| \leq \lambda \\ Y_{ij} & \text{if } Y_{ij} \geq -\lambda \end{cases} \quad (14)$$

and where $k \in [n_3]$ and A is a constant.

Referring back to FIG. 2, after the synthesized video data in the transform domain has been generated, the inverse transform module 228 is configured to transform the synthesized video data in the transform domain back into the original domain to generate synthesized video data in the original domain, corresponding to $X^r$ 230. Further details regarding the inverse transform module 228 will now be described below with reference to FIG. 5.

Figures 5, 6:
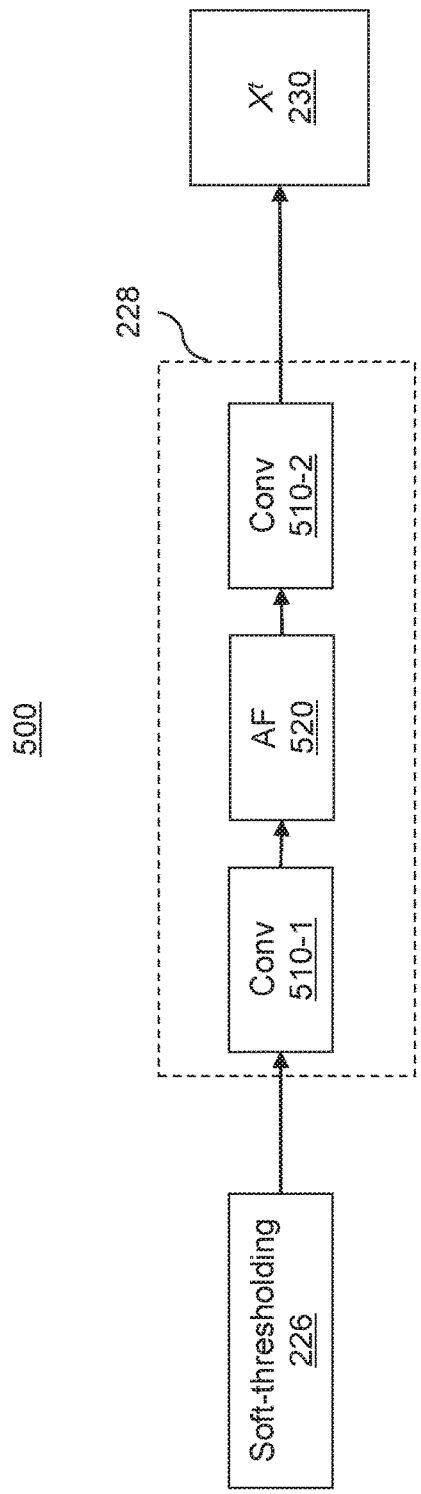
FIG. 5 is a block/flow diagram of an exemplary inverse transform module of the phase of FIG. 2, in accordance with an embodiment of the present invention.
FIG. 6 is exemplary pseudocode depicting a tensor iterative shrinkage thresholding algorithm (ISTA), in accordance with an embodiment of the present invention.

With reference to FIG. 5, a block/flow diagram is provided illustrating an exemplary transform-based tensor neural network (TTNet) 500. As shown, the TTNet 500 includes the soft-thresholding module 226 and the inverse transform module 228 configured to generate the tensor output 230 described above with reference to FIG. 2.

As further shown, in this illustrative example, the inverse transform module 228 includes a plurality of components including a first convolution (Conv) component 510-1, an activation function (AF) component 520 and a second Conv component 510-2. In one embodiment, the first and second Conv components 510-1 and 510-2 implement two-dimensional (2D) multi-channel convolutions with different kernels, and the AF component 520 includes a rectified linear unit (ReLU) that incorporates nonlinearity. The network structure of the inverse transform module 228 is similar to that of the transform module 224, except that their Conv components have different kernel parameters.

The first Conv component 510-1 receives the synthesized video data in the transform domain from the soft-thresholding module 222 to generate Conv($\bar{X}^r$). Then, the AF component 520 applies the activation function to Conv($\bar{X}^r$). For example, if the AF component 520 includes a rectified linear unit (ReLU), then the application of the activation function to Conv($\bar{X}^r$) generates ReLU(Conv($\bar{X}^r$)). Then, the second Conv component 510-2 applies a second convolution to ReLU(Conv($\bar{X}^r$)) to generate Conv(ReLU(Conv($\bar{X}^r$)))=$F^{-1}(\bar{X}^r)$=$F^{-1}F((X^r))$=$X^r$ 230.

Referring back to FIG. 2, a loss function can be used as described above with reference to FIG. 1. More specifically, the loss function can be a linear combination of a first part that evaluates the accuracy of synthesized video frames and a second part that imposes sparsity. Further details regarding the loss function are described above with reference to FIG. 1.

Exemplary pseudocode 600 describing the ISTA algorithm iterated from t=0 to t=N to generate a final tensor output $X^N$ is illustrated with reference to FIG. 6.

Figure 7:
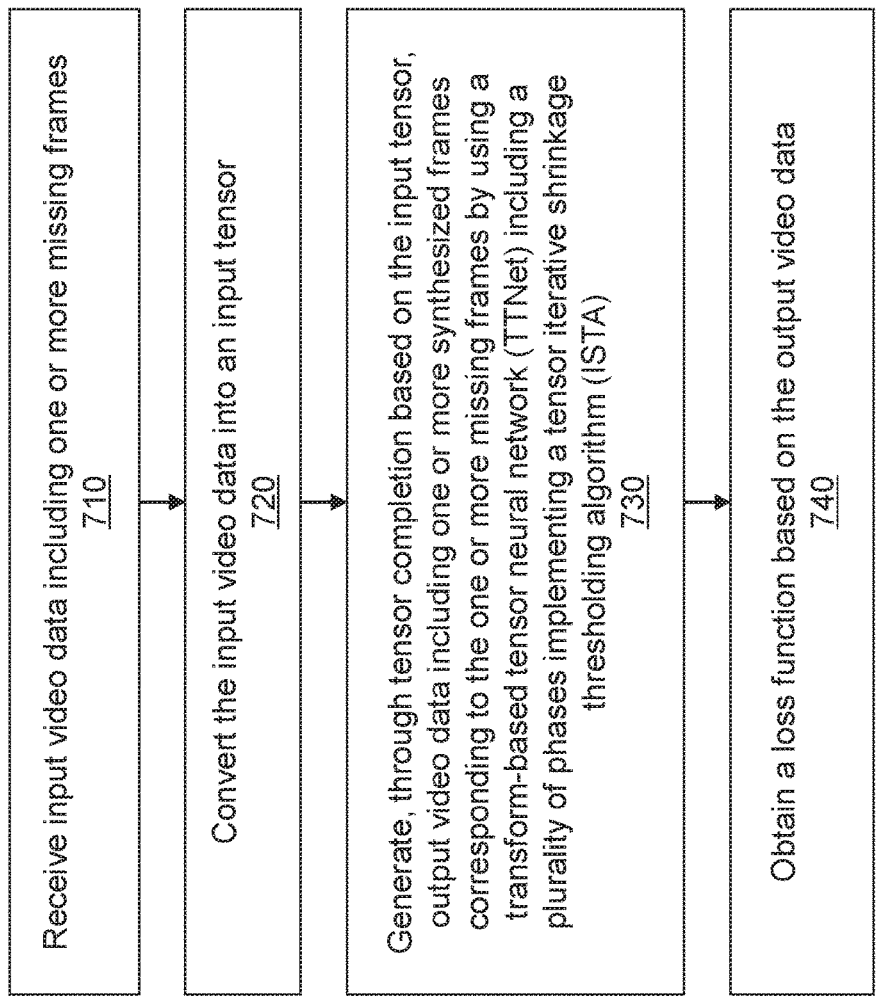
FIG. 7 is a block/flow diagram of a system/method for implementing video frame synthesis using a transform-based tensor neural network (TTNet) implementing a tensor iterative shrinkage thresholding algorithm (ISTA), in accordance with an embodiment of the present invention.

Referring now to FIG. 7, a block/flow diagram is provided showing a system/method 700 for implementing video frame synthesis using a transform-based tensor neural network (TTNet). More specifically, the system/method 700 can be used to perform interpolation and/or prediction of video frames. For example, the system/method 700 can be used to improve the peak signal-to-noise (PSNR) of interpolation and prediction (e.g., 4.13 dB and 4.16 dB), reduce motion blurring, and avoid artifacts.

At block 710, input video data including one or more missing frames is received.

At block 720, the input video data is converted into an input tensor.

At block 730, output video data including one or more synthesized frames corresponding to the one or more missing frames is generated through tensor completion based on the input tensor by using a transform-based tensor neural network (TTNet) including a plurality of phases implementing a tensor iterative shrinkage thresholding algorithm (ISTA). More specifically, each of the plurality of phases can include a plurality of modules configured to implement one inference iteration of the tensor ISTA. Further details regarding implementing an inference iteration of the tensor ISTA will be described in further detail below with reference to FIG. 8.

At block 740, a loss function is obtained based on the output video data. In one embodiment, the loss function includes a first part that evaluates the accuracy of the one or more synthesized frames, and a second part that imposes sparsity. More specifically, the loss function may be a linear combination of the first and second parts. For example, the loss function can be defined by equation (11), as described above with reference to FIG. 1.

Further details regarding block 710-750 of FIG. 7 are described above with reference to FIGS. 1-6.

Figure 8:
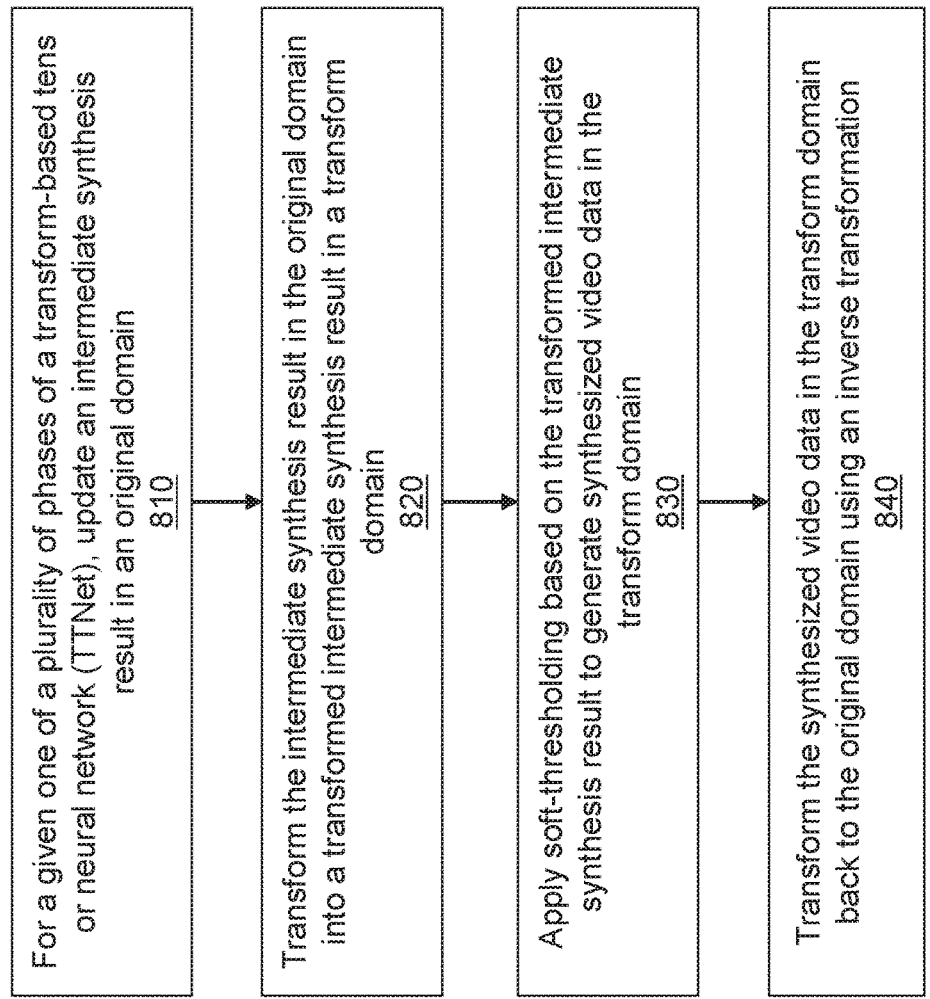
FIG. 8 is a block/flow diagram of a system/method for implementing an inference iteration of the tensor ISTA of FIG. 7, in accordance with an embodiment of the present invention.

Referring now to FIG. 8, a block/flow diagram is provided illustrating a system/method 800 for implementing an inference iteration of a tensor iterative shrinkage thresholding algorithm (ISTA).

At block 810, for a given one of a plurality of phases of a transform-based tensor neural network (TTNet), an intermediate synthesis result in an original domain is updated. Further details regarding block 810 are described above with reference to FIG. 2.

At block 820, the intermediate synthesis result in the original domain is transformed into a transformed intermediate result in a transform domain. More specifically, transforming the intermediate synthesis result in the original domain into the transformed intermediate result can include applying a first convolution to the intermediate synthesis result in the original domain, applying an activation function to the output of the first convolution, and applying a second convolution to the output of the activation function. In one embodiment, the first and second convolutions include two-dimensional (2D) multi-channel convolutions with different kernels, and the activation function is a rectified linear unit (ReLU) that incorporates nonlinearity. Further details regarding block 820 are described above with reference to FIGS. 2 and 3.

At block 830, soft-thresholding is applied based on the transformed intermediate synthesis result to generate synthesized video data in the transform domain. More specifically, the synthesized video data in the transform domain corresponds to a tensor. In one embodiment, applying the soft-thresholding based on the transformed intermediate synthesis result to generate the synthesized video data in the transform domain includes applying a plurality of soft-thresholding operations to each (frontal) slice of the transformed intermediate synthesis result, and stacking outputs of each of the plurality of soft-threshold operations to form the synthesized video data in the transform domain. Further details regarding block 830 are described above with reference to FIGS. 2 and 4.

At block 840, the synthesized video data in the transform domain is transformed back to the original domain using an inverse transformation. More specifically, transforming the synthesized video data in the transform domain back to the original domain using an inverse transformation can include applying a third convolution to the synthesized video data in the transform domain, applying a second activation function to the output of the third convolution, and applying a fourth convolution to the output of the third activation function. In one embodiment, the third and fourth convolutions include 2D multi-channel convolutions with different kernels, and the activation function is a ReLU that incorporates nonlinearity. The third and fourth convolutions can have different kernel parameters than the first and second convolutions of block 820. Further details regarding block 840 are described above with reference to FIGS. 2 and 5.

Further details regarding the ISTA algorithm are described above with reference to FIG. 6.

Figure 9:
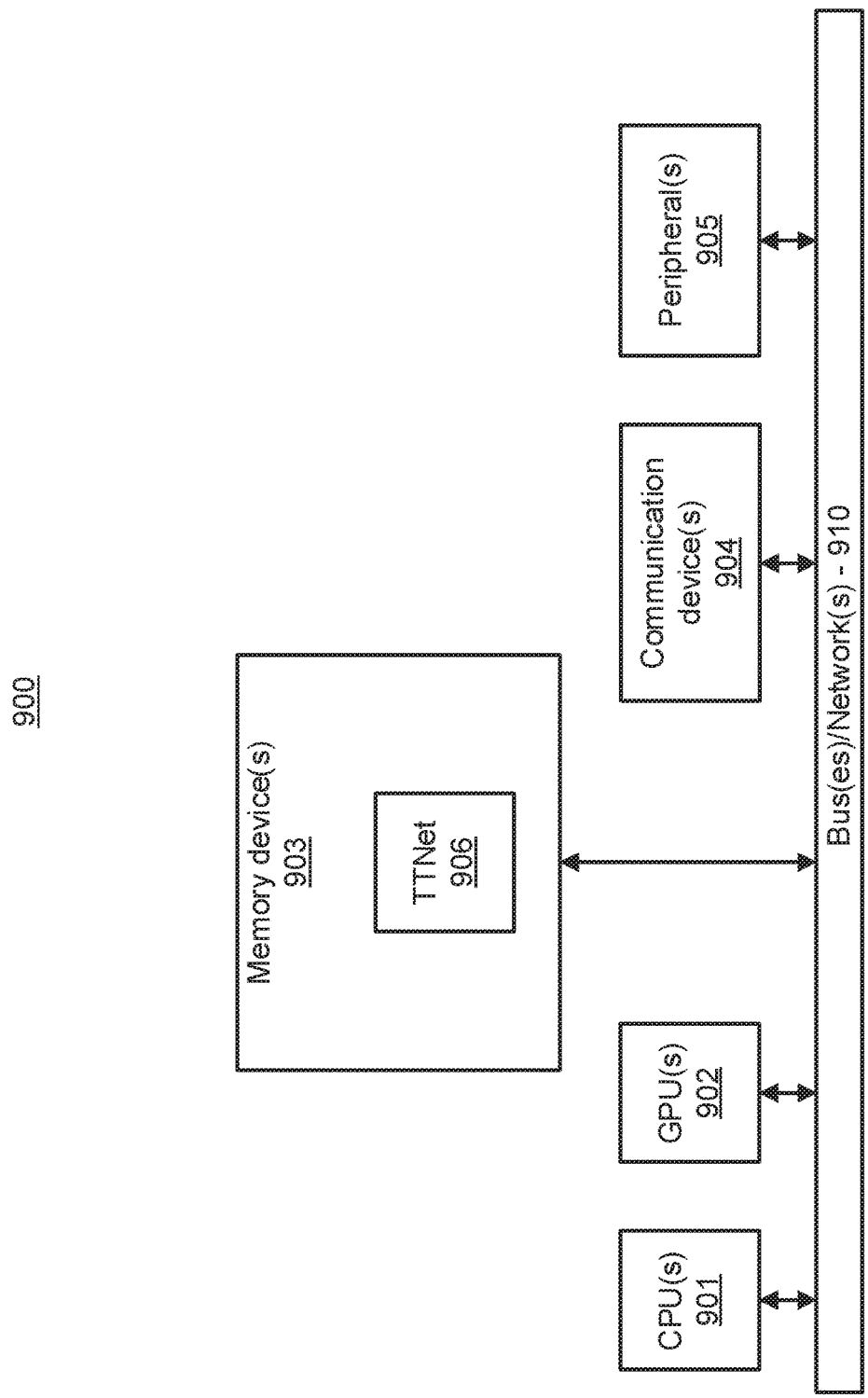
FIG. 9 is a block diagram of a processing system, in accordance with an embodiment of the present invention.

Referring now to FIG. 9, a block diagram is provided showing an exemplary processing system 900, in accordance with an embodiment of the present invention. The processing system 900 includes a set of processing units (e.g., CPUs) 901, a set of GPUs 902, a set of memory devices 903, a set of communication devices 904, and set of peripherals 905. The CPUs 901 can be single or multi-core CPUs. The GPUs 902 can be single or multi-core GPUs. The one or more memory devices 903 can include caches, RAMs, ROMs, and other memories (flash, optical, magnetic, etc.). The communication devices 904 can include wireless and/or wired communication devices (e.g., network (e.g., WIFI, etc.) adapters, etc.). The peripherals 905 can include a display device, a user input device, a printer, an imaging device, and so forth. Elements of processing system 900 are connected by one or more buses or networks (collectively denoted by the figure reference numeral 910).

In an embodiment, memory devices 903 can store specially programmed software modules configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 903 store program code 906 for implementing a transform-based tensor neural network (TTNet). As described in further detail above, the TTNet can be used to perform video frame synthesis (e.g., video frame interpolation and/or video frame prediction) in an improved manner.

Of course, the processing system 900 may also include other elements (not shown), as readily contemplated by one of skill in the art, as well as omit certain elements. For example, various other input devices and/or output devices can be included in processing system 900, depending upon the particular implementation of the same, as readily understood by one of ordinary skill in the art. For example, various types of wireless and/or wired input and/or output It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
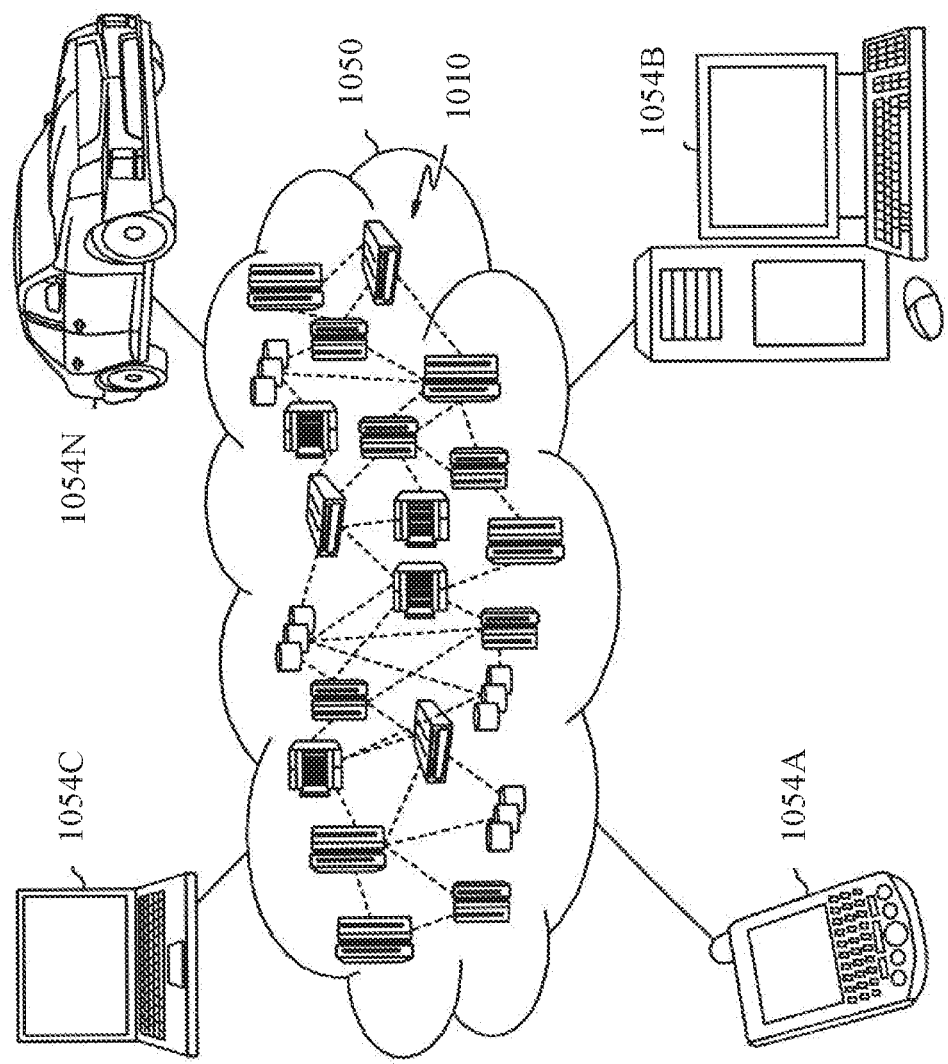
FIG. 10 is a block diagram showing an illustrative cloud computing environment having one or more cloud computing nodes with which local computing devices used by cloud consumers communicate in accordance with one embodiment.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 2 are intended to be illustrative only and that computing nodes 1010 and cloud computing environment 1050 can communicate with any type of computerized device over any type of network and/or network addressable connection (e.g., using a web browser).

Figure 11:
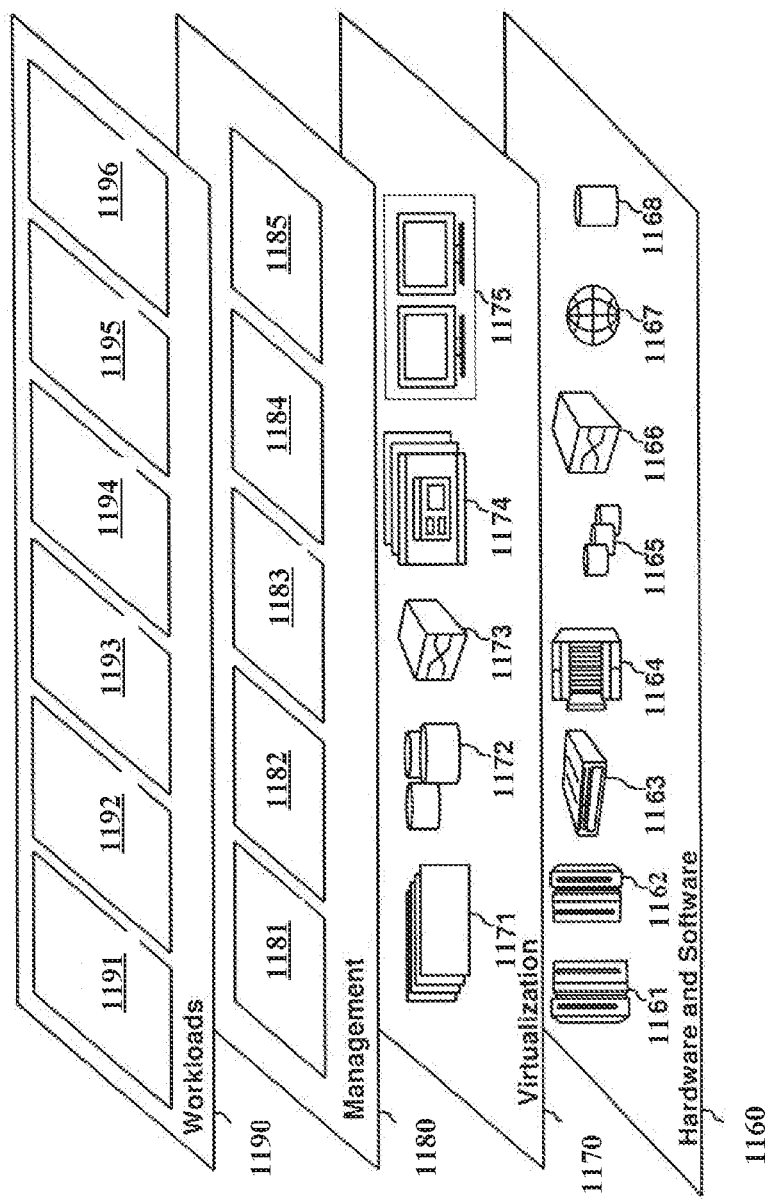
FIG. 11 is a block diagram showing a set of functional abstraction layers provided by a cloud computing environment in accordance with one embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and video synthesis 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Having described preferred embodiments of video synthesis (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for implementing video frame synthesis using a tensor neural network, comprising:
receiving input video data including one or more missing frames;
converting the input video data into an input tensor;
generating, through tensor completion based on the input tensor, output video data including one or more synthesized frames corresponding to the one or more missing frames by using a transform-based tensor neural network (TTNet) including a plurality of phases implementing a tensor iterative shrinkage thresholding algorithm (ISTA); and
obtaining a loss function based on the output video data.

2. The method of claim 1, wherein generating the output video data further includes:
for a given one of the plurality of phases of the TTNet, transforming an intermediate synthesis result in an original domain into a transformed intermediate synthesis result in a transform domain;
applying soft-thresholding based on the transformed intermediate synthesis result to generate synthesized video data in the transform domain; and
transforming the synthesized video data in the transform domain back to the original domain using an inverse transformation.

3. The method of claim 2, further comprising updating the intermediate result in the original domain prior to transforming the intermediate result in the original domain, wherein the intermediate synthesis result is defined based in part on a video tensor received by the given one of the plurality of phases and an observation tensor.

4. The method of claim 2, wherein transforming the intermediate synthesis result in the original domain into the transformed intermediate synthesis result further includes applying a first convolution to the intermediate synthesis result, applying an activation function to an output of the first convolutional network, and applying a second convolution to an output of the activation function to generate the transformation.

5. The method of claim 4, wherein the first and second convolutions include two-dimensional (2D) multi-channel convolutions with different kernels, and the activation function is a rectified linear unit (ReLU).

6. The method of claim 2, wherein applying soft-thresholding based on the transformed intermediate synthesis result to generate the synthesized video data in the transform domain further includes applying a plurality of soft-thresholding operations in parallel to each frontal slice of the transformed intermediate synthesis result, and stacking outputs of the plurality of soft-thresholding operations to generate the synthesized video data in the transform domain.

7. The method of claim 2, wherein transforming the synthesized video data in the transform domain back to the original domain using an inverse transformation further includes applying a first convolution to the synthesized video data in the transform domain, applying an activation function to an output of the first convolution, and applying a second convolution to an output of the activation function.

8. The method of claim 7, wherein the first and second convolutions include 2D multi-channel convolutions with different kernels, and the activation function is a ReLU.

9. The method of claim 1, where the loss function includes a first part that evaluates an accuracy of the one or more synthesized frames, and a second part that imposes sparsity.

10. A computer readable storage medium comprising a computer readable program for implementing video frame synthesis using a tensor neural network, wherein the computer readable program when executed on a computer causes the computer to perform a method including:
receiving input video data including one or more missing frames;
converting the input video data into an input tensor;
generating, through tensor completion based on the input tensor, output video data including one or more synthesized frames corresponding to the one or more missing frames by using a transform-based tensor neural network (TTNet) including a plurality of phases implementing a tensor iterative shrinkage thresholding algorithm (ISTA); and
obtaining a loss function based on the output video data.

11. The computer readable storage medium of claim 10, wherein generating the output video data further includes:
for a given one of the plurality of phases of the TTNet, transforming an intermediate synthesis result in an original domain into a transformed intermediate synthesis result in a transform domain;
applying soft-thresholding based on the transformed intermediate synthesis result to generate synthesized video data in the transform domain; and
transforming the synthesized video data in the transform domain back to the original domain using an inverse transformation.

12. The computer readable storage medium of claim 11, wherein the method further includes updating the intermediate result in the original domain prior to transforming the intermediate result in the original domain, and wherein the intermediate synthesis result is defined based in part on a video tensor received by the given one of the plurality of phases and an observation tensor.

13. The computer readable storage medium of claim 11, wherein:
transforming the intermediate synthesis result in the original domain into the transformed intermediate synthesis result further includes applying a first convolution to the intermediate synthesis result, applying a first rectified linear unit (ReLU) to an output of the first convolution, and applying a second convolution to an output of the first ReLU to generate the transformation, wherein the first and second convolutions include two-dimensional (2D) multi-channel convolutions with different kernels;
transforming the synthesized video data in the transform domain back to the original domain using an inverse transformation further includes applying a third convolution to the synthesized video data in the transform domain, applying a second ReLU to an output of the third convolution, and applying a fourth convolution to an output of the second ReLU; and the first, second, third and fourth convolutions include 2D multi-channel convolutions with different kernels.

14. The computer readable storage medium of claim 11, wherein applying soft-thresholding based on the transformed intermediate synthesis result to generate the synthesized video data in the transform domain further includes applying a plurality of soft-thresholding operations in parallel to each frontal slice of the transformed intermediate synthesis result, and stacking outputs of the plurality of soft-thresholding operations to generate the synthesized video data in the transform domain.

15. The computer readable storage medium of claim 11, wherein the loss function includes a first part that evaluates an accuracy of the one or more synthesized frames, and a second part that imposes sparsity.

16. A system for implementing video frame synthesis using a tensor neural network, comprising:
a memory configured to store program code; and
at least one processor device operatively coupled to the memory and configured to execute program code stored on the memory to:
receive input video data including one or more missing frames;
convert the input video data into an input tensor;
generate, through tensor completion based on the input tensor, output video data including one or more synthesized frames corresponding to the one or more missing frames by using a transform-based tensor neural network (TTNet) including a plurality of phases implementing a tensor iterative shrinkage thresholding algorithm (ISTA); and
obtain a loss function based on the output video data.

17. The system of claim 16, wherein the at least one processor device is further configured to generate the output video data by:
for a given one of the plurality of phases of the TTNet, transforming an intermediate synthesis result in the original domain into a transformed intermediate synthesis result in a transform domain;
applying soft-thresholding based on the transformed intermediate synthesis result to generate synthesized video data in the transform domain; and
transforming the synthesized video data in the transform domain back to the original domain using an inverse transformation.

18. The system of claim 17, wherein:
the at least one processor device is further configured to transform the intermediate synthesis result in the original domain into the transformed intermediate synthesis result by applying a first convolution to the intermediate synthesis result, applying a first rectified linear unit (ReLU) to an output of the first convolution, and applying a second convolution to an output of the first ReLU to generate the transformation;
the at least one processor device is further configured to transform the synthesized video data in the transform domain back to the original domain using an inverse transformation by applying a third convolution to the synthesized video data in the transform domain, applying a second ReLU to an output of the third convolution, and applying a fourth convolution to an output of the second ReLU; and
the first, second, third and fourth convolutions include 2D multi-channel convolutions with different kernels.

19. The system of claim 17, wherein the at least one processor device is further configured to apply soft-thresholding based on the transformed intermediate synthesis result to generate the synthesized video data in the transform domain by applying a plurality of soft-thresholding operations in parallel to each frontal slice of the transformed intermediate synthesis result, and stacking outputs of the plurality of soft-thresholding operations to generate the synthesized video data in the transform domain.

20. The system of claim 16, wherein the loss function includes a first part that evaluates an accuracy of the one or more synthesized frames, and a second part that imposes sparsity.

* * * * *